No. 845,367. PATENTED FEB. 26, 1907.
C. R. MILLER.
DOUGH DIVIDER.
APPLICATION FILED MAY 19, 1906.
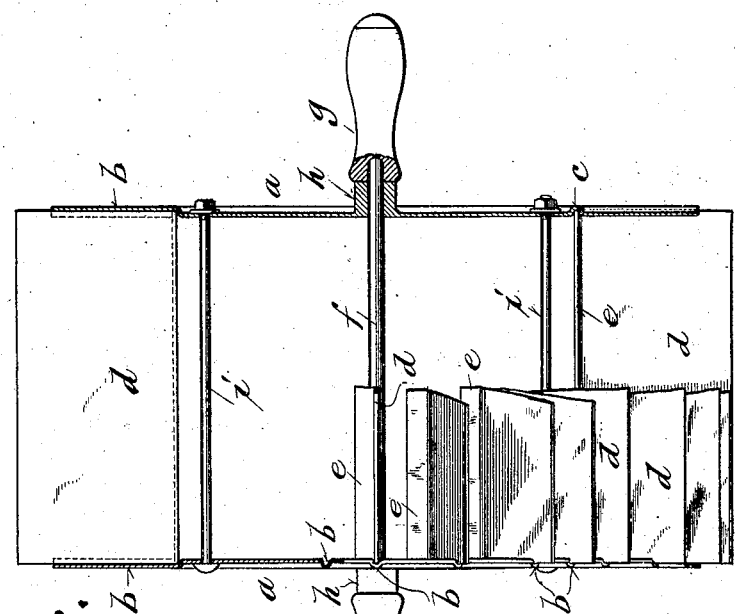
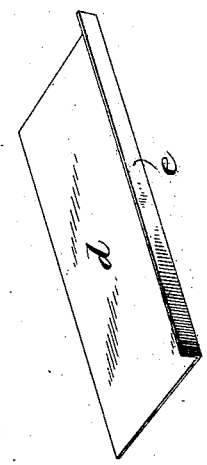
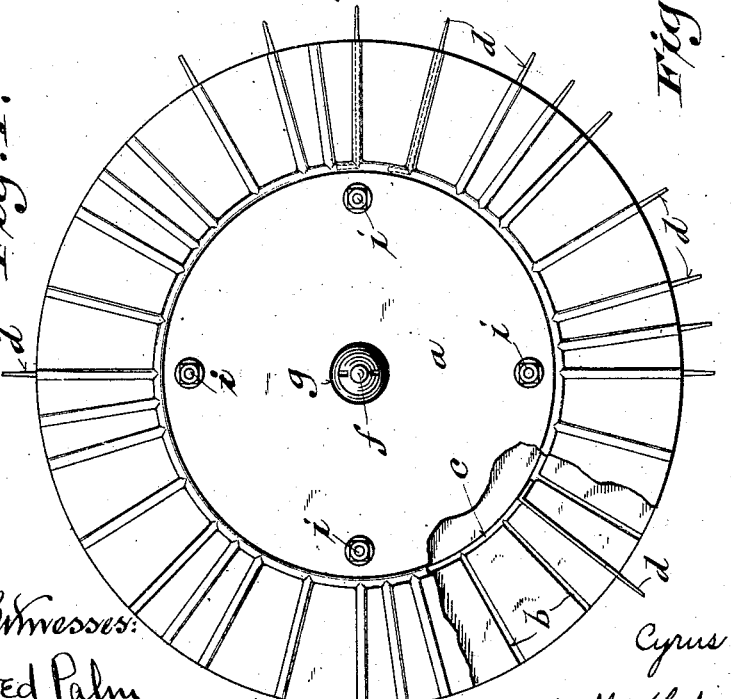
Witnesses:
Fred Palm
Bernard C. Roloff
Inventor:
Cyrus R. Miller
By Whitley Vandersmith Bothwell Hawley
Attorneys
THE NORRIS PETERS CO., WASHINGTON, D. C.

UNITED STATES PATENT OFFICE.

CYRUS R. MILLER, OF MILWAUKEE, WISCONSIN, ASSIGNOR TO WALTER A. ANGER, OF MILWAUKEE, WISCONSIN.

DOUGH-DIVIDER.

No. 845,367.     Specification of Letters Patent.     Patented Feb. 26, 1907.

Application filed May 19, 1906. Serial No. 317,666.

*To all whom it may concern:*

Be it known that I, CYRUS R. MILLER, a citizen of the United States, residing at Milwaukee, in the county of Milwaukee and State of Wisconsin, have invented certain new and useful Improvements in Dough-Dividers, of which the following is a specification, reference being had to the accompanying drawings, forming a part thereof.

This invention relates to implements for cutting or dividing rolls or strips of dough crosswise into sections or parts of the desired size for baking. Its main objects are to divide the rolls or strips of dough into uniform or predetermined sizes, to facilitate and expedite this kind of work in the preparation of dough for baking, to make the knives capable of being readily and easily adjusted or rearranged for dividing the dough into parts or sections of different sizes, and thereby adapting the implement to various kinds of work, and generally to improve the construction and operation of implements of this class.

It consists in certain novel features of construction and in the peculiar arrangement and combinations of parts, as hereinafter particularly described, and pointed out in the claims.

In the accompanying drawings like characters designate the same parts in the several figures.

Figure 1 is an end elevation of a dough-divider embodying the present invention, a part of the front end plate or section being broken away. Fig. 2 is a side elevation and partial axial section of the device, and Fig. 3 is a perspective view of one of the knives or blades.

The device comprises two end plates or sections $a$, which may be conveniently made of either cast or sheet metal. They are preferably of substantially circular shape and are formed on their inner sides with radially-arranged grooves or recesses $b$ and annular grooves $c$, intersecting the grooves $b$ at their inner ends.

Knives or blades $d$ are removably fitted at their ends in the grooves $b$ and are formed at their back or inner edges with flanges or offsets $e$, which engage with the grooves $c$, and thereby hold the knives in place against radial displacement in the grooves $b$ when the parts are assembled as shown in the drawings.

The end plates or sections $a$ are centrally connected by a shaft or rod $f$, upon the ends of which are revolubly mounted axial handles $g$. On their outer sides the plates or sections $a$ are preferably formed or provided with hubs $h$ to afford longer bearings for the shaft or rod $f$ and bearings for the inner ends of the handles $g$. One end of the rod or shaft $f$ is threaded and provided with a nut, as shown in Fig. 2, so that it may be readily removed from and replaced in the end plates or sections, and said plates or sections may be detached or separated from each other.

In addition to the central shaft or rod $f$ the end plates or sections $a$ are adjustably connected by a number of bolts or rods $i$, parallel with the shaft or rod $f$ and each threaded and provided at one end with a nut for drawing said plates or sections together and securing the knives or blades $d$ in place between them. By unscrewing the nuts on the shaft or rod $f$ and on the bolts or rods $i$ the end plates or sections $a$ may be spread and the knives or blades $d$ released from the grooves or recesses therein.

The radial grooves $b$ are grouped or arranged so that the knives or blades may be variously spaced for different kinds of work. With the grouping or arrangement of the grooves as shown in the drawings, four, eight, twelve, sixteen, or twenty-four knives or blades may be set at equal distances apart, or they may be variously grouped or spaced, more or less knives being used.

In the operation of the device it is held in both hands by the handles $g$ and run lengthwise over a roll or strip of dough laid on a board, the knives according to their grouping or spacing cutting or dividing the roll or strip into sections or parts of the desired size or sizes.

The knives or blades are so set that when the implement is carried over a roll of dough lengthwise thereof to cut it into the desired lengths or sections the layers of the roll at the end of each length or section next to the receding sides of the blades will be pressed and stuck together. This is a desirable feature of the machine in making what are commonly known as "twisted rolls," since the folds or convolutions of the rolls are stuck and held together sufficiently to prevent unwinding and losing their shape before they are baked.

Various changes in details of construction and arrangement of parts of the implement may be made without departing from the principle and intended scope of the invention.

I claim—

1. In a dough-divider, the combination of end plates or sections having radially-arranged grooves or recesses on their inner sides and knives removably fitted at the ends in said grooves or recesses, substantially as described.

2. In a dough-divider the combination of end plates or sections having radially-arranged grooves or recesses on their inner sides and knives removably fitted at the ends in said radial grooves or recesses and having flanges or offsets for holding them in place therein, substantially as described.

3. In a dough-divider the combination of end plates or sections having radially-arranged grooves or recesses and intersecting annular grooves or recesses on their inner sides, and knives fitted at the ends in said radial grooves or recesses and having flanges or offsets at their backs adapted to engage with said annular grooves or recesses, substantially as described.

4. In a dough-divider the combination of end plates or sections having radially-asranged grooves or recesses on their inner sides, knives removably fitted at the ends in said grooves or recesses and means for adjustably connecting said end plates or sections and securing them with the interposed knives in place, substantially as described.

5. In a dough-divider the combination of end plates or sections having radially-arranged grooves or recesses on their inner sides and axial handles projecting from their outer sides, knives removably fitted at the ends in said grooves or recesses, and means for adjustably connecting said end plates or sections and securing them upon the interposed knives, substantially as described.

6. In a dough-divider the combination of end plates or sections having radially-arranged grooves on their inner sides, a shaft passing centrally through and connecting said plates or sections, handles revolubly mounted on the ends of said shaft outside of said plates or sections, and knives removably fitted at the ends in said grooves or recesses, substantially as described.

7. In a dough-divider the combination of end plates or sections having radially-arranged grooves or recesses on their inner sides and axial handles projecting from their outer sides, knives removably fitted at their ends in said grooves or recesses, and bolts adjustably connecting said end plates or sections parallel with their axis and securing them upon the interposed knives, substantially as described.

In witness whereof I hereto affix my signature in presence of two witnesses.

CYRUS R. MILLER.

Witnesses:
BERNARD C. ROLOFF,
FRED J. MEINHARDT.